US010592832B2

(12) United States Patent
Chetlur et al.

(10) Patent No.: US 10,592,832 B2
(45) Date of Patent: Mar. 17, 2020

(54) EFFECTIVE UTILIZATION OF IDLE CYCLES OF USERS

(71) Applicant: International Business Machines Corporation, Armonk, NY (US)

(72) Inventors: Malolan Chetlur, Bangalore (IN); Ravindranath Kokku, Bangalore (IN); Vinay K. Reddy, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 468 days.

(21) Appl. No.: 15/223,317

(22) Filed: Jul. 29, 2016

(65) Prior Publication Data

US 2018/0032945 A1    Feb. 1, 2018

(51) Int. Cl.
*G06Q 10/06* (2012.01)
*G06F 3/01* (2006.01)
*G06F 3/038* (2013.01)
*G06F 3/023* (2006.01)

(52) U.S. Cl.
CPC ...... *G06Q 10/063116* (2013.01); *G06F 3/011* (2013.01); *G06F 3/023* (2013.01); *G06F 3/038* (2013.01); *G06F 2203/011* (2013.01)

(58) Field of Classification Search
CPC ......... G06Q 10/00; G06Q 40/00; G06F 17/60
USPC ....................................................... 705/7.16
See application file for complete search history.

(56) References Cited

U.S. PATENT DOCUMENTS

| | | | | |
|---|---|---|---|---|
| 6,442,529 B1 * | 8/2002 | Krishan | ................. | G06Q 30/02 705/14.52 |
| 8,028,060 B1 * | 9/2011 | Wyld | ................. | H04L 43/0805 709/224 |
| 9,600,150 B1 * | 3/2017 | Xu | ................. | G06F 3/0484 |
| 2002/0128803 A1 * | 9/2002 | Skinner | ................. | B21B 37/50 702/188 |
| 2008/0133287 A1 * | 6/2008 | Slattery | ................. | G06F 11/3419 705/32 |
| 2009/0106079 A1 * | 4/2009 | Gutlapalli | ................. | G06Q 10/06 705/7.26 |

(Continued)

OTHER PUBLICATIONS

Martin et al., "Recommending Activities in Collaborative M-Learning," Lecture Notes in Learning and Teaching, 2006.

(Continued)

*Primary Examiner* — Romain Jeanty
(74) *Attorney, Agent, or Firm* — Ryan, Mason & Lewis, LLP (57) ABSTRACT

Methods, systems, and computer program products for effective utilization of idle cycles of users are provided herein. A computer-implemented method includes identifying periods of a user's idle time by analyzing user activity data; obtaining measurements for parameters of the user's working environment; determining activities to present to the user during the identified periods of idle time by deriving user interests in view of user actions; matching one of the determined activities to one of the identified periods of idle time based on the obtained measurements; delivering, to the user, an activity that is representative of the matched activity, wherein the representative activity comprises an abbreviated activity sharing similarities with the matched activity; and delivering the matched activity to the user during the identified periods of idle time in response to a positive user response to the representative activity.

20 Claims, 4 Drawing Sheets

(56) References Cited

U.S. PATENT DOCUMENTS

| | | | | |
|---|---|---|---|---|
| 2010/0067679 | A1* | 3/2010 | Lei | H04L 67/24 |
| | | | | 379/201.02 |
| 2011/0302003 | A1* | 12/2011 | Shirish | G06Q 10/0639 |
| | | | | 705/7.38 |
| 2013/0275187 | A1* | 10/2013 | Patel | G06Q 10/06398 |
| | | | | 705/7.42 |
| 2014/0344718 | A1 | 11/2014 | Rapaport et al. | |
| 2015/0182843 | A1 | 7/2015 | Esposito et al. | |
| 2016/0086119 | A1* | 3/2016 | Puchta | G06Q 10/06316 |
| | | | | 705/7.26 |

OTHER PUBLICATIONS

Grant, R. Venture Beat, http://venturebeat.com/2012/11/07/udemys-new-ipad-app-turns-idle-minutes-into-learning-opportunities/, Nov. 7, 2012.
Ramachandran, S., https://www.td.org/Publications/Magazines/TD/TD-Archive/2015/12/From-Idle-Time-to-Time-to-Learn, Dec. 8, 2015.
Hill, S. Digital Trends, http://www.digitaltrends.com/mobile/how-to-use-google-now/2/, Apr. 28, 2016.
Tomadaki et al., Innovative Approaches for Learning and Knowledge Sharing, First European Conference on Technology Enhanced Learning, EC-TEL 2006, Crete, Greece, Oct. 1-4, 2006.

* cited by examiner

FIG. 4

EFFECTIVE UTILIZATION OF IDLE CYCLES OF USERS

FIELD

The present application generally relates to information technology, and, more particularly, to computing efficiency techniques.

BACKGROUND

Idle time during commutes, travel delays, queue delays, etc. can create inefficiencies as well as unplanned opportunities for utility. However, the unpredictability and temporal variability of such opportunities commonly create challenges that preclude such utility from being enacted.

SUMMARY

In one embodiment of the present invention, techniques for effective utilization of idle cycles of users are provided. An exemplary computer-implemented method can include automatically identifying one or more periods of a user's idle time by analyzing data associated with regular activity of the user, and obtaining measurements for one or more parameters of the user's working environment, via utilization of one or more sensors in the user's working environment. Such a method can also include determining one or more activities to present to the user during the one or more identified periods of idle time, by deriving one or more user interests in view of multiple instances of the user's actions, and matching at least one of the determined activities to at least one of the identified periods of idle time based on analysis of the obtained measurements for the one or more parameters. Additionally, such a method can include delivering, to the user, an activity that is representative of the at least one matched activity, wherein the representative activity comprises an abbreviated activity sharing one or more similarities with the at least one matched activity, and delivering the at least one matched activity to the user during the at least one identified periods of idle time, in response to a positive user response to the representative activity.

In another embodiment of the invention, an exemplary computer-implemented method can include automatically identifying one or more periods of a user's idle time by analyzing historical data associated with regular activity of the user carried out on a user device of the user, and capturing measurements for multiple parameters of the user's working environment, via utilization of one or more sensors resident on the user device. Such a method can also include determining one or more activities to present to the user during the one or more identified periods of idle time, by deriving one or more user interests in view of historical user actions carried out on the user device, and matching at least one of the determined activities to at least one of the identified periods of idle time based on analysis of the captured measurements for the parameters. Further, such a method can additionally include delivering, to the user, an activity that is representative of the at least one matched activity, via an interface of the user device, wherein the representative activity comprises an abbreviated activity sharing one or more similarities with the at least one matched activity, and scheduling the at least one matched activity for the user during the at least one identified periods of idle time, in response to a positive user response to the representative activity.

Another embodiment of the invention or elements thereof can be implemented in the form of an article of manufacture tangibly embodying computer readable instructions which, when implemented, cause a computer to carry out a plurality of method steps, as described herein. Furthermore, another embodiment of the invention or elements thereof can be implemented in the form of an apparatus including a memory and at least one processor that is coupled to the memory and configured to perform noted method steps. Yet further, another embodiment of the invention or elements thereof can be implemented in the form of means for carrying out the method steps described herein, or elements thereof; the means can include hardware module(s) or a combination of hardware and software modules, wherein the software modules are stored in a tangible computer-readable storage medium (or multiple such media).

These and other objects, features and advantages of the present invention will become apparent from the following detailed description of illustrative embodiments thereof, which is to be read in connection with the accompanying drawings.

DETAILED DESCRIPTION

As described herein, an embodiment of the present invention includes techniques for effective utilization of idle cycles of users. At least one embodiment of the invention includes automatically providing a matching and/or micro-learning activity to a user during his or her idle time, wherein such an activity is selected from an inferred set of desired actions (also referred to herein as to-dos) of a user by analyzing the user's emotions, health, ambience, gestures and interactions. Such an embodiment can include creating and scheduling what is referred to herein as a "teaser activity," which is an activity proposed to detect the intent and feasibility to accomplish a learning task or activity based on the response to the teaser activity. A teaser activity technique mimics a desired task's required conditions, and can be implemented before delivering the desired task itself. A positive response to a teaser activity can be embodied, for example, via one or more gestures of the user and/or acceptance by the user of the teaser activity.

Accordingly, at least one embodiment of the invention can include assisting a user of a user device (such as a mobile phone, a tablet, etc.) in utilizing spare time and/or idle time effectively by automatically scheduling one or more activities during such spare and/or idle time based on various user characteristics and/or measured parameters. Accordingly, one or more embodiments of the invention can be implemented as an application (app) on the user's user device. Such characteristics and/or measured parameters can include, for example, user affect, user health, ambience, and user gestures. Additionally, the scheduled activities can include context-specific learning activities, and one or more embodiments of the invention can further include assisting in the activity completion via implementation of one or more activity teasers. As further described herein, activity teasers, although not full length tasks, can include tasks that mimic an original task's requirements and conditions. Accordingly, activity teaser completion can indicate and/or significantly improve the likelihood of completion of the original task. Learning activities can include, for example, watching videos on the user device, reading documents on the user device, answering quizzes on the user device, interacting with another user, etc.

By way merely of illustration, consider the following example use cases. In a first example use case, user J travels to location A every day from location B. At least one embodiment of the invention can include profiling user J's global positioning system (GPS) data to generate a prediction that user J commonly has 30 minutes of idle time every day in the morning and in the evening due to traffic between location A and location B. Further, user J is interested in online learning, as evidenced by the observation that user J has enrolled for several massive open online courses (MOOC). Based on the predicted idle time, an example embodiment of the invention can include detecting user J's emotional state and health.

In this illustrative example, user J's emotional state and health are detected and found to be suitable for an engaged listening activity. With this knowledge, at least one embodiment of the invention can include scheduling a teaser activity to attract user J's attention to a listening activity to determine if user J responds positively. In this example, the teaser activity can include providing audio specifying the activity, the topic and an introduction to the content for a limited period of time (for example, 30 seconds). Such an embodiment can additionally include requesting user J to respond to the teaser activity with a gesture and/or indication (such as the pressing of a button on user J's user device) to continue with the activity. Additionally, at least one embodiment of the invention can include measuring the response and determining whether or not user J is available and can be engaged for a listening activity. If yes (that is, user J is available and capable of being engaged for a listening activity), such an embodiment can further include scheduling an appropriate listening activity (such as, for example, a 20 minute podcast) involving one or more selected topics during the predicted periods of idle time to make productive use of those idle times. Content can, for example, be derived from the MOOCs and the learning portals to which the user is subscribed. Content can also be identified based on the user's online searches.

In a second example use case, user A frequently travels, and her profiling data shows that she routinely waits at least 45 minutes in airport lounges. Additionally, user A is interested in learning from the experiences of other people whose profiles share similarities to hers. Based on the predicted/observed idle time, an example embodiment of the invention can include detecting user A's ambient noise, affect and health. In this illustrative example, user A's ambient noise, affect and health are found to be suitable for engaged speaking. Accordingly, one or more embodiments of the invention can include scheduling a speaking-related teaser activity to an automated agent for 30 seconds to determine the feasibility and intent of user A. With the knowledge that a person (user B) having a profile that shares multiple similarities with that of user A, and user A are free and/or idle at the same time, at least one embodiment of the invention can include scheduling a meeting task/activity for user A and user B. In such an example, user A and user B need not be at the same location for a speaking activity to occur (such an activity can be carried out over the phone, for example). In the case that both users are present at the same location, a meeting activity can be scheduled.

In a third example use case, user A enjoys new gadgets, and at times visits shopping malls for a variety of activities. Additionally, user A specifies that the time she is at the mall can be considered free and/or idle time. Accordingly, at least one embodiment of the invention can include detecting and/or identifying that user A is in good health and affect, and can also include identifying new gadgets or technological experiences within a given proximity to user A's location within the mall. Further, such an embodiment can include scheduling a teaser activity to determine user A's ability to be able to move around and, based on user A's response to the teaser activity, recommending to user A that she visit a specific location to encounter new gadgets or technological experiences.

Figure 1:
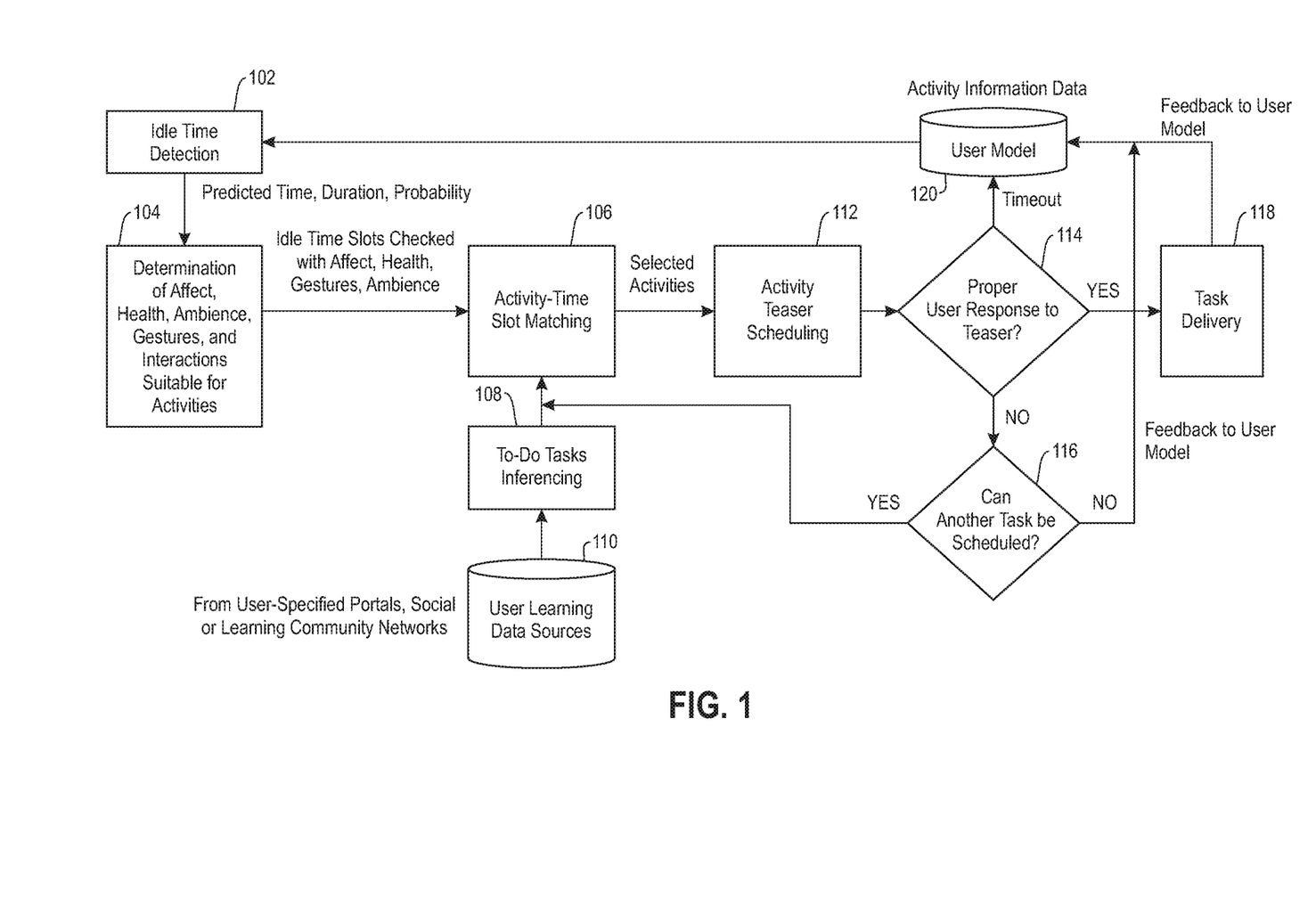
FIG. 1 is a diagram illustrating system architecture, according to an exemplary embodiment of the invention.

FIG. 1 is a diagram illustrating system architecture, according to an embodiment of the invention. By way of illustration, FIG. 1 depicts an idle time detection component 102, which obtains input (such as user activity information data) from a user model database 120 and generates an output that includes predicted idle times, durations thereof, and the probabilities thereof. The idle time detection component 102 can automatically detect candidate idle times such as, for example, commuting times, and hangout times in a place other than the user's home or office. In one or more embodiments of the invention, the idle time detection component 102 can query the user to automatically tag candidate idle times through explicit user feedback, and/or the idle time detection component 102 can tag a time when a learning event is scheduled and the user does not accept the task. Hangout detection can be performed, for example, by statistically weighing the geo-spatial presence of the user during specific times of the day and specific days of the week. In one or more embodiments of the invention, the user's home and office are pre-designated as the most common hangout locations, while all other locations are potential candidates for micro-learning.

The output generated by the idle time detection component 102 is provided to a user affect, health, ambience, gestures, and interactions determination component 104, which analyzes various data sources to determine whether the observed user affect, health, ambience (noise and light levels detected by the user device, for example), gestures (hands-free, head-free, etc.), and/or interactions (the number of people surrounding the user, for example) are suitable for one or more activities. Specifically, component 104 detects various parameters around the candidate idle times. For example, to detect the health of the user, component 104 can determine if the body temperature of the user is within a predetermined range (such as, for instance, a range exhibited during earlier learning tasks). Additionally, component 104 can determine if the heart rate (pulse) and/or the blood pressure of the user is within a predetermined range (such as, for instance, a range exhibited during earlier learning tasks).

Further, at least one embodiment of the invention can include computing a health score for engaging in idle time micro-learning tasks. Such a health score, for example, can be between 0 and 1, with 1 being a perfect fit (health-wise) for the micro-learning tasks, and 0 representing a health status that is unfit for the micro-learning tasks. Computing such a health score can include computing an average of individual body signal levels (wherein, for example, each signal that is within a predetermined thresholds equates to a score of 1, and each signal that is outside a predetermined threshold equates to a score of 0). Also, similar scores can be computed for ambience, gesture, affect, and interaction parameters.

Based on the determination made by component 104, the predicted idle time slots are checked against the observed user affect, health, ambience, gestures, and interactions. Based on the outcome of this analysis, an activity-time slot matching component 106 selects one or more activities and provides the selected activities to an activity teaser scheduling component 112. Given a set of potential tasks and the context and/or attributes thereof, along with the predicted idle slots (and the context thereof), the matching component 106 will find an appropriate plan for the user that includes one or more idle time slots and one or more tasks. One or more embodiments of the invention can also include utilizing the affect score, the health score, the ambience score, the gesture score, and/or the interaction score as input for the matching component 106. Additionally, the activity-time slot matching component 106 also receives input from a to-do tasks inferencing component 108, which utilizes data from user learning data sources 110 (including, for example, user-specified portals, social or learning community networks, etc.).

The to-do tasks inferencing component 108 tracks the user's interests (via online searches, etc.) to build to-do list of tasks/activities. Learning content from various sources that are relevant for those interests can be marked as to-do tasks. Additionally, the to-do tasks inferencing component 108 can extract the to-do list from sources (contained within database 110, for example) such as student portals and/or learning management systems (LMS) (which can include collaborative learning, quizzes etc.). By way of further example, videos marked (by the user) and/or paused/buffered for subsequent viewing (related to a specific learning interest) can also be marked for the to-do list.

The to-do tasks inferencing component 108 can also infer to-do tasks requirements and the context of such tasks (attributes of the tasks, for example). By way of illustration, social learning tasks such as calling or meeting people within a network will be scheduled when the other people are also free and/or idle. Additionally, certain tasks can include ambience, gesture and/or interaction requirements. For instance, a reading task or a video-watching task might require proper ambient lighting and limited ambient noise, while podcast task might not require similar conditions. Also, certain tasks need to be executed in a particular sequence (for example, a quiz can be scheduled only after a course video). Further, certain tasks need to be completed in a single execution iteration, while other tasks can be completed in an intermittent fashion (listening to podcast can be done intermittently, for example). Additionally some tasks may be automatically executed while other tasks are executed semi-manually. For example, a task that needs user confirmation before initiation is a semi-manual task (such as, for instance, placing a call to a mentor requires user confirmation).

As detailed herein, one or more embodiments include delivering (prior to a task) a teaser activity to determine the feasibility and intent of task execution. In at least one embodiment of the invention, a teaser activity demands similar capabilities from the user, participants and/or devices, but is short in duration and can be gamified as well. For example, for reading learning task, a teaser can include reading sample text or viewing an image within a specified time.

Referring again to FIG. 1, the activity teaser scheduling component 112 proposed the activity teaser to the user (via the user device), and an inquiry is made in step 114 as to whether the user provided a proper response to the activity teaser. If yes (that is, the user provided a proper/positive response to the activity teaser), then component 118 delivers the task (such as a learning task) to the user (via the user device) and a timeout is transmitted to the user model database 120. Further, the task delivery component can subsequently provide feedback to the user model database 120. If no (that is, the user did not provide a proper/positive response to the activity teaser), then a subsequent inquiry is made as to whether another task can be scheduled. If yes (that is, another task can be scheduled), the system returns to the activity-time slot matching component 106 for further consideration. If no (that is, another task cannot be scheduled), feedback is provided to the user model database 120. Such feedback can include information pertaining to the acceptance or rejection of the tasks, as well as the conditions (task details, idle slot details) under which such a decision was made. The incorporation of such feedback can facilitate continuous improvement to the model, resulting in high(er) confidence matching of tasks with time slots.

Figure 2:
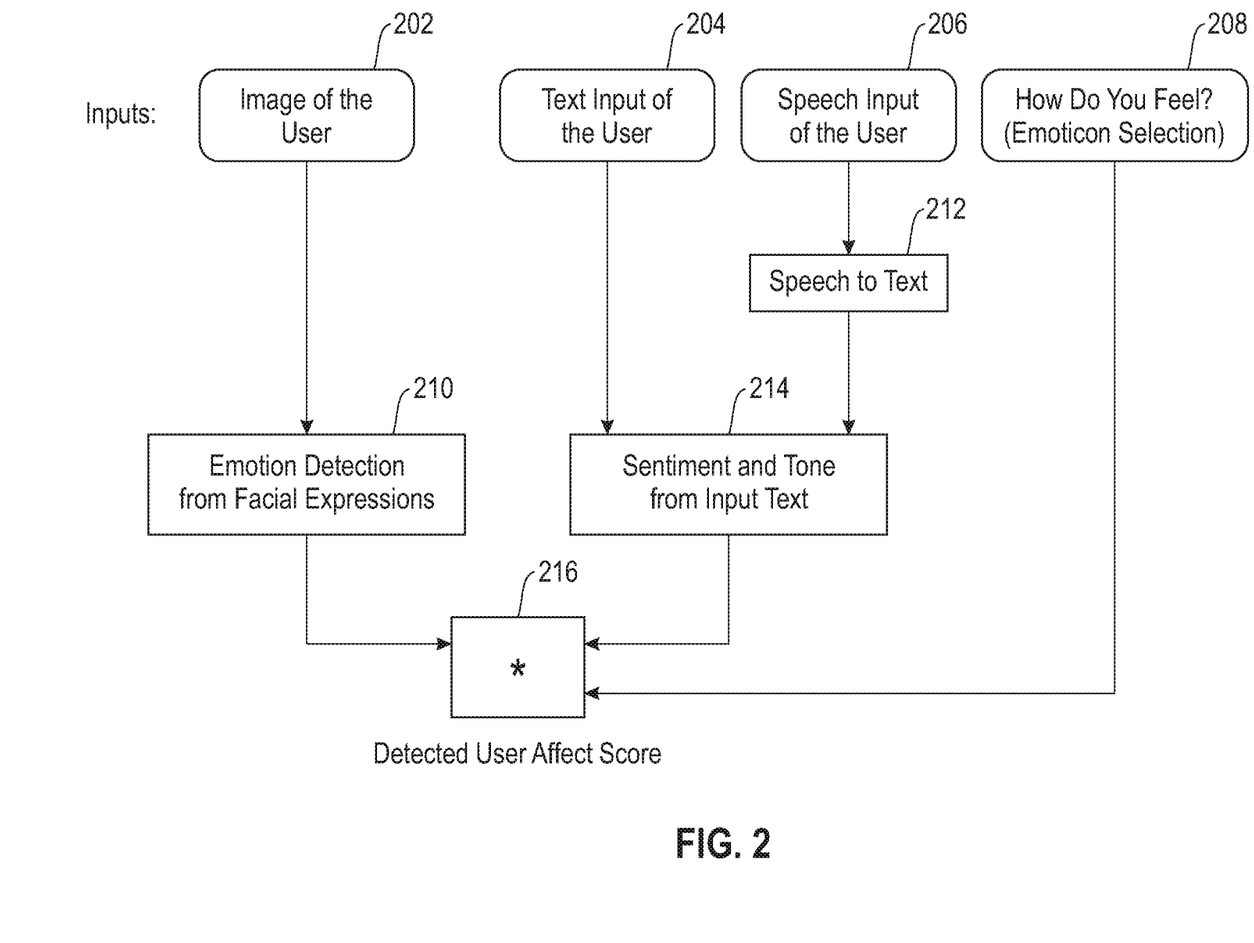
FIG. 2 is a diagram illustrating system architecture, according to an embodiment of the invention.

FIG. 2 is a diagram illustrating system architecture, according to an embodiment of the invention. By way of illustration, FIG. 2 depicts detecting user affect based on various inputs, including one or more images 202 of the user, text input 204 of the user, speech input 206 of the user, and selected emoticon input 208 of the user. One or more embodiments of the invention can include using a camera present in/on the user device (such as a smart phone) to detect facial expressions and affect of the user via analysis of one or more images 102 carried out by component 210. Additionally, such an embodiment can also include implementing a sentiment and tone analyzer 214 to analyze the sentiment and emotions of the user based on text input 204 typed into the user device by the user.

Also, one or more embodiments of the invention can include performing automatic speech to text conversion via component 212 using the speech input 206, and subsequently performing affect detection on the converted text via component 214. Accordingly, in at least one embodiment of the invention, a user affect score 216 can be computed as a combination of affect detections derived from several signals and/or sensors, and the various affect detections can be a weighted prior to forming the combination. Affect can be inferred through the user's text, speech, image analysis as well as emoticon selection inputs. Such dimensions can be weighted via some prioritized (user-prioritized, for instance) order. By way merely of example, one such order might indicate that image based affect is more highly weighted than speech based affect, which is more highly weighted than text based affect. Alternatively, the affect with the highest degree of confidence can be selected as the user affect score 216.

Figure 3:
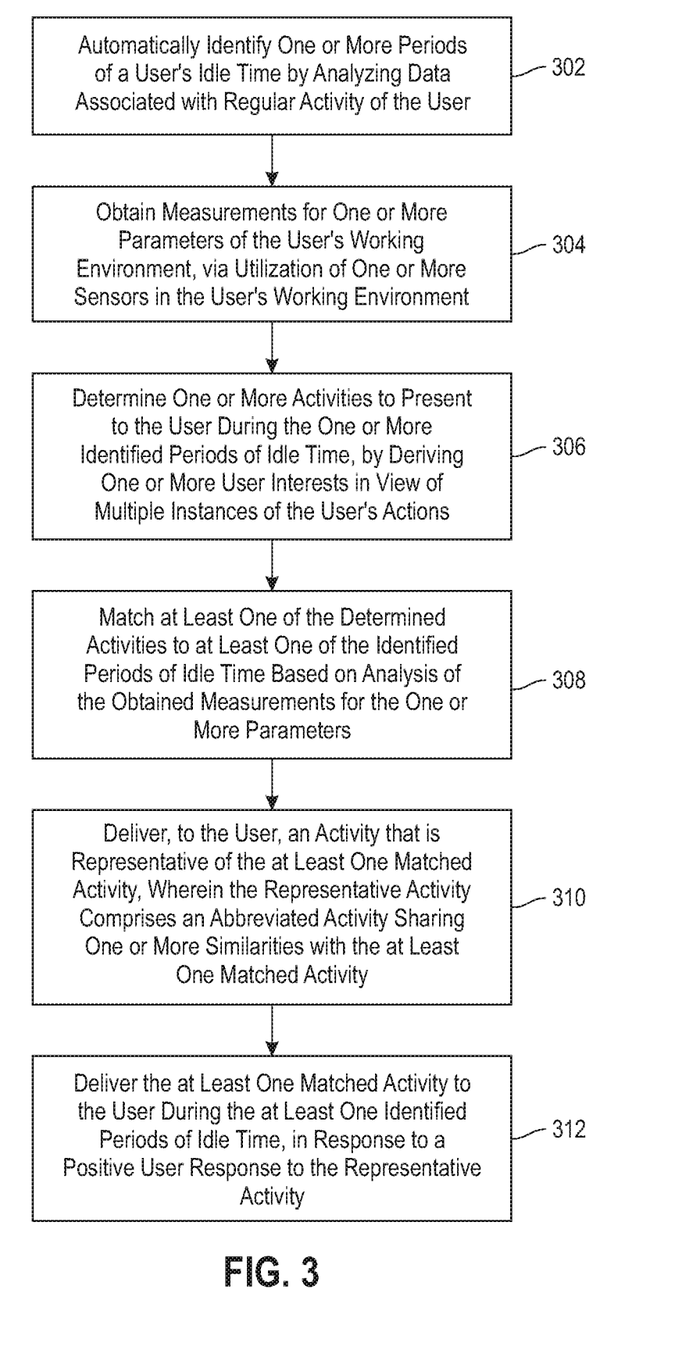
FIG. 3 is a flow diagram illustrating techniques, according to an embodiment of the invention.

FIG. 3 is a flow diagram illustrating techniques, according to an embodiment of the present invention. Step 302 includes automatically identifying one or more periods of a user's idle time by analyzing data associated with regular activity of the user. Automatically identifying one or more periods of idle time can include automatically determining a duration of each of the identified periods of idle time as well as automatically determining a probability of occurrence for each of the identified periods of idle time. Additionally, automatically identifying one or more periods of idle time can include querying the user to tag candidate idle times, tagging a period of time wherein an activity is scheduled and the user does not engage in the activity, and/or statistically weighing the geo-spatial presence of the user during selected times of each day and on selected days of the week.

Step 304 includes obtaining measurements for one or more parameters of the user's working environment, via utilization of one or more sensors in the user's working environment. The one or more parameters can include user affect, one or more user health parameters (such as body temperature, heart rate and/or blood pressure), one or more ambience parameters (such as an amount of light and/or noise in an environment surrounding the user), one or more user gestures (such as facial expressions, hands-free capabilities, head-free capabilities, etc.), and/or one or more user interactions. User interactions can include user interactions that indicate the user's presence in a group of multiple individuals and/or user interactions that indicate the user's lack of presence in a group of multiple individuals.

Step 306 includes determining one or more activities to present to the user during the one or more identified periods of idle time, by deriving one or more user interests in view of multiple instances of the user's actions. Determining the one or more activities can additionally include determining one or more requirements for each of the determined activities.

Step 308 includes matching at least one of the determined activities to at least one of the identified periods of idle time based on analysis of the obtained measurements for the one or more parameters. Step 310 includes delivering, to the user, an activity that is representative of the at least one matched activity, wherein the representative activity comprises an abbreviated activity sharing one or more similarities with the at least one matched activity. Step 312 delivering the at least one matched activity to the user during the at least one identified periods of idle time, in response to a positive user response to the representative activity. The positive user response to the representative activity can include one or more predetermined user gestures and/or one or more user inputs of a predetermined type.

Also, an additional embodiment of the invention includes include automatically identifying one or more periods of a user's idle time by analyzing historical data associated with regular activity of the user carried out on a user device of the user, and capturing measurements for multiple parameters of the user's working environment, via utilization of one or more sensors resident on the user device. Such an embodiment can also include determining one or more activities to present to the user during the one or more identified periods of idle time, by deriving one or more user interests in view of historical user actions carried out on the user device, and matching at least one of the determined activities to at least one of the identified periods of idle time based on analysis of the captured measurements for the parameters. Further, such an embodiment can additionally include delivering, to the user, an activity that is representative of the at least one matched activity, via an interface of the user device, wherein the representative activity comprises an abbreviated activity sharing one or more similarities with the at least one matched activity, and scheduling the at least one matched activity for the user during the at least one identified periods of idle time, in response to a positive user response to the representative activity.

At least one embodiment of the invention (such as the techniques depicted in FIG. 3, for example), can include implementing a service via a transmission server to receive data from a data source and send selected data to users (for example, at a provided destination address of a wireless device (such as a number for a cellular phone, etc.)). The transmission server includes a memory, a transmitter, and a microprocessor. Such an embodiment of the invention can also include providing a viewer application to the users for installation on their individual devices. Additionally, in such an embodiment of the invention, after a user enrolls, the service receives user characteristic information and measured user parameters sent from one or more data sources to the transmission server. The server can process the information, for example, based upon user-provided user preference information that is stored in memory on the server. Subsequently, an alert is generated containing a teaser activity and/or idle time activity information. The alert can be formatted into data blocks, for example, based upon any provided alert format preference information. Subsequently, the alert and/or formatted data blocks are transmitted over a data channel to the user's wireless device. After receiving the alert, the user can, for example, connect the wireless device to the user's computer, whereby the alert causes the user's computer to automatically launch the application provided by the service to display the alert. When connected to the Internet, the user may then use the viewer application (for example, via clicking on a uniform resource locator (URL) associated with the data source provided in the alert) to facilitate a connection from the remote user computer to the data source over the Internet for additional information.

The techniques depicted in FIG. 3 can also, as described herein, include providing a system, wherein the system includes distinct software modules, each of the distinct software modules being embodied on a tangible computer-readable recordable storage medium. All of the modules (or any subset thereof) can be on the same medium, or each can be on a different medium, for example. The modules can include any or all of the components shown in the figures and/or described herein. In an embodiment of the invention, the modules can run, for example, on a hardware processor. The method steps can then be carried out using the distinct software modules of the system, as described above, executing on a hardware processor. Further, a computer program product can include a tangible computer-readable recordable storage medium with code adapted to be executed to carry out at least one method step described herein, including the provision of the system with the distinct software modules.

Additionally, the techniques depicted in FIG. 3 can be implemented via a computer program product that can include computer useable program code that is stored in a computer readable storage medium in a data processing system, and wherein the computer useable program code was downloaded over a network from a remote data processing system. Also, in an embodiment of the invention, the computer program product can include computer useable program code that is stored in a computer readable storage medium in a server data processing system, and wherein the computer useable program code is downloaded over a network to a remote data processing system for use in a computer readable storage medium with the remote system.

An embodiment of the invention or elements thereof can be implemented in the form of an apparatus including a memory and at least one processor that is coupled to the memory and configured to perform exemplary method steps.

Figure 4:
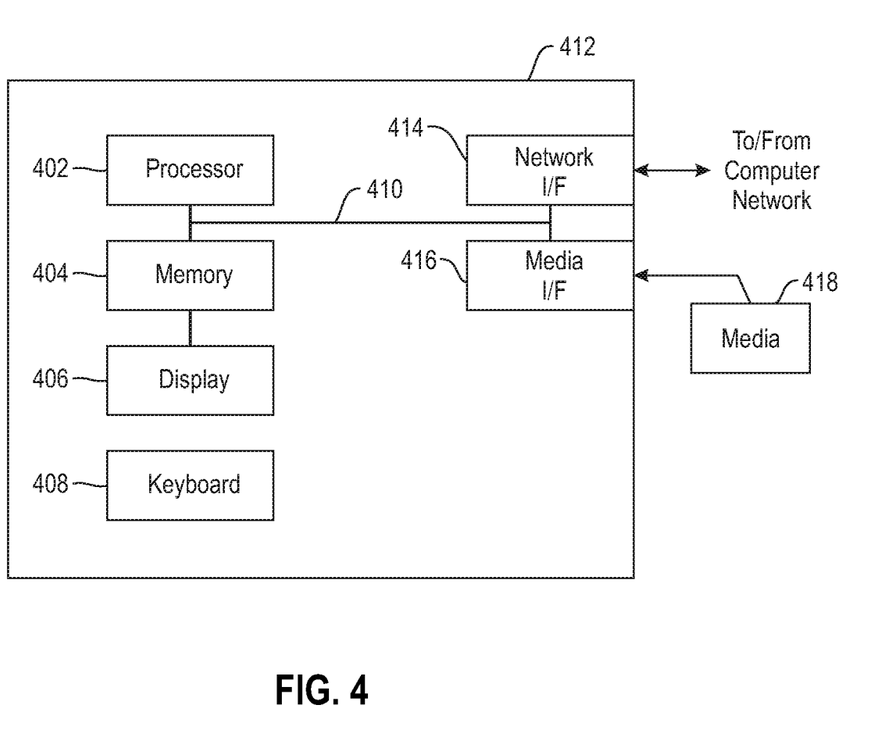
FIG. 4 is a system diagram of an exemplary computer system on which at least one embodiment of the invention can be implemented.

Additionally, an embodiment of the present invention can make use of software running on a computer or workstation. With reference to FIG. 4, such an implementation might employ, for example, a processor 402, a memory 404, and an input/output interface formed, for example, by a display 406 and a keyboard 408. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, a mechanism for inputting data to the processing unit (for example, mouse), and a mechanism for providing results associated with the processing unit (for example, printer). The processor 402, memory 404, and input/output interface such as display 406 and keyboard 408 can be interconnected, for example, via bus 410 as part of a data processing unit 412. Suitable interconnections, for example via bus 410, can also be provided to a network interface 414, such as a network card, which can be provided to interface with a computer network, and to a media interface 416, such as a diskette or CD-ROM drive, which can be provided to interface with media 418.

Accordingly, computer software including instructions or code for performing the methodologies of the invention, as described herein, may be stored in associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 402 coupled directly or indirectly to memory elements 404 through a system bus 410. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including, but not limited to, keyboards 408, displays 406, pointing devices, and the like) can be coupled to the system either directly (such as via bus 410) or through intervening I/O controllers (omitted for clarity).

Network adapters such as network interface 414 may also be coupled to the system to enable the data processing system to become coupled to other data processing systems or remote printers or storage devices through intervening private or public networks. Modems, cable modems and Ethernet cards are just a few of the currently available types of network adapters.

As used herein, including the claims, a "server" includes a physical data processing system (for example, system 412 as shown in FIG. 4) running a server program. It will be understood that such a physical server may or may not include a display and keyboard.

The present invention may be a system, a method, and/or a computer program product at any possible technical detail level of integration. The computer program product may include a computer readable storage medium (or media) having computer readable program instructions thereon for causing a processor to carry out embodiments of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform embodiments of the present invention.

Embodiments of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It should be noted that any of the methods described herein can include an additional step of providing a system comprising distinct software modules embodied on a computer readable storage medium; the modules can include, for example, any or all of the components detailed herein. The method steps can then be carried out using the distinct software modules and/or sub-modules of the system, as described above, executing on a hardware processor 402. Further, a computer program product can include a computer-readable storage medium with code adapted to be implemented to carry out at least one method step described herein, including the provision of the system with the distinct software modules.

In any case, it should be understood that the components illustrated herein may be implemented in various forms of hardware, software, or combinations thereof, for example, application specific integrated circuit(s) (ASICS), functional circuitry, an appropriately programmed digital computer with associated memory, and the like. Given the teachings of the invention provided herein, one of ordinary skill in the related art will be able to contemplate other implementations of the components of the invention.

Additionally, it is understood in advance that implementation of the teachings recited herein are not limited to a particular computing environment. Rather, embodiments of the present invention are capable of being implemented in conjunction with any type of computing environment now known or later developed.

For example, cloud computing is a model of service delivery for enabling convenient, on-demand network access to a shared pool of configurable computing resources (for example, networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (for example, country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (for example, storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (for example, web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (for example, host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (for example, mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (for example, cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of another feature, step, operation, element, component, and/or group thereof.

At least one embodiment of the present invention may provide a beneficial effect such as, for example, creating and scheduling a teaser activity to detect the intent and feasibility of accomplishing a learning task based on positive responses to a teaser activity.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
automatically identifying one or more periods of a user's idle time by analyzing data associated with regular activity of the user;
obtaining measurements for one or more parameters of the user's working environment, via utilization of one or more sensors in the user's working environment;
determining one or more activities to present to the user during the one or more identified periods of idle time, by deriving one or more user interests in view of multiple instances of the user's actions;
matching at least one of the determined activities to at least one of the identified periods of idle time, based on analysis of the obtained measurements for the one or more parameters;
delivering, to the user, an activity that is representative of the at least one matched activity, wherein the representative activity comprises an abbreviated activity sharing one or more similarities with the at least one matched activity; and
delivering the at least one matched activity to the user during the at least one identified periods of idle time, in response to a positive user response to the representative activity;
wherein the steps are carried out by at least one computing device.

2. The computer-implemented method of claim 1, wherein said automatically identifying comprises automatically determining a duration of each of the identified periods of idle time.

3. The computer-implemented method of claim 1, wherein said automatically identifying comprises automatically determining a probability of occurrence for each of the identified periods of idle time.

4. The computer-implemented method of claim 1, wherein said automatically identifying comprises querying the user to tag candidate idle times.

5. The computer-implemented method of claim 1, wherein said automatically identifying comprises tagging a period of time wherein an activity is scheduled and the user does not engage in the activity.

6. The computer-implemented method of claim 1, wherein said automatically identifying comprises statistically weighing the geo-spatial presence of the user during selected times of each day and on selected days of the week.

7. The computer-implemented method of claim 1, wherein the one or more parameters comprises user affect.

8. The computer-implemented method of claim 1, wherein the one or more parameters comprises one or more user health parameters.

9. The computer-implemented method of claim 8, wherein the one or more user health parameters comprise body temperature, heart rate and/or blood pressure.

10. The computer-implemented method of claim 1, wherein the one or more parameters comprises one or more ambience parameters.

11. The computer-implemented method of claim 10, wherein the one or more ambience parameters comprises an amount of light in an environment surrounding the user.

12. The computer-implemented method of claim 10, wherein the one or more ambience parameters comprises an amount of noise in an environment surrounding the user.

13. The computer-implemented method of claim 1, wherein the one or more parameters comprises one or more user interactions.

14. The computer-implemented method of claim 13, wherein the one or more user interactions comprises one of (i) one or more user interactions that indicate the user's presence in a group of multiple individuals and (ii) one or more user interactions that indicate the user's lack of presence in a group of multiple individuals.

15. The computer-implemented method of claim 1, wherein said determining the one or more activities further comprises determining one or more requirements for each of the determined activities.

16. The computer-implemented method of claim 1, wherein the positive user response to the representative activity comprises one or more predetermined user gestures.

17. The computer-implemented method of claim 1, wherein the positive user response to the representative activity comprises one or more user inputs of a predetermined type.

18. A computer program product comprising a computer readable storage medium having program instructions embodied therewith, the program instructions executable by a device to cause the device to:
   automatically identify one or more periods of a user's idle time by analyzing data associated with regular activity of the user;
   obtain measurements for one or more parameters of the user's working environment, via utilization of one or more sensors in the user's working environment;
   determine one or more activities to present to the user during the one or more identified periods of idle time, by deriving one or more user interests in view of multiple instances of the user's actions;
   match at least one of the determined activities to at least one of the identified periods of idle time, based on analysis of the obtained measurements for the one or more parameters;
   deliver, to the user, an activity that is representative of the at least one matched activity, wherein the representative activity comprises an abbreviated activity sharing one or more similarities with the at least one matched activity; and
   deliver the at least one matched activity to the user during the at least one identified periods of idle time, in response to a positive user response to the representative activity.

19. A system comprising:
   a memory; and
   at least one processor coupled to the memory and configured for:
      automatically identifying one or more periods of a user's idle time by analyzing data associated with regular activity of the user;
      obtaining measurements for one or more parameters of the user's working environment, via utilization of one or more sensors in the user's working environment;
      determining one or more activities to present to the user during the one or more identified periods of idle time, by deriving one or more user interests in view of multiple instances of the user's actions;
      matching at least one of the determined activities to at least one of the identified periods of idle time, based on analysis of the obtained measurements for the one or more parameters;
      delivering, to the user, an activity that is representative of the at least one matched activity, wherein the representative activity comprises an abbreviated activity sharing one or more similarities with the at least one matched activity; and
      delivering the at least one matched activity to the user during the at least one identified periods of idle time, in response to a positive user response to the representative activity.

20. A computer-implemented method, comprising:
   automatically identifying one or more periods of a user's idle time by analyzing historical data associated with regular activity of the user carried out on a user device of the user;
   capturing measurements for multiple parameters of the user's working environment, via utilization of one or more sensors resident on the user device;
   determining one or more activities to present to the user during the one or more identified periods of idle time, by deriving one or more user interests in view of historical user actions carried out on the user device;
   matching at least one of the determined activities to at least one of the identified periods of idle time based on analysis of the captured measurements for the parameters;
   delivering, to the user, an activity that is representative of the at least one matched activity, via an interface of the user device, wherein the representative activity comprises an abbreviated activity sharing one or more similarities with the at least one matched activity; and
   scheduling the at least one matched activity for the user during the at least one identified periods of idle time, in response to a positive user response to the representative activity.

* * * * *